United States Patent
Chandramowle et al.

(10) Patent No.: US 9,640,852 B2
(45) Date of Patent: *May 2, 2017

(54) ENHANCED SIGNAL AMPLITUDE IN ACOUSTIC-MAGNETOMECHANICAL EAS MARKER

(71) Applicants: Gopal Chandramowle, Boca Raton, FL (US); Randy Zirk, Delray Beach, FL (US)

(72) Inventors: Gopal Chandramowle, Boca Raton, FL (US); Randy Zirk, Delray Beach, FL (US)

(73) Assignee: Tyco Fire & Security GmbH, Neuhausen Rheinfall (CH)

( * ) Notice: Subject to any disclaimer, the term of this patent is extended or adjusted under 35 U.S.C. 154(b) by 268 days.

This patent is subject to a terminal disclaimer.

(21) Appl. No.: 14/487,266

(22) Filed: Sep. 16, 2014

(65) Prior Publication Data
US 2015/0356844 A1 Dec. 10, 2015

Related U.S. Application Data

(60) Provisional application No. 62/009,438, filed on Jun. 9, 2014, provisional application No. 62/015,987, filed on Jun. 23, 2014.

(51) Int. Cl.
*G08B 13/14* (2006.01)
*H01P 7/06* (2006.01)
(Continued)

(52) U.S. Cl.
CPC .......... *H01P 7/06* (2013.01); *G06K 19/07728* (2013.01); *G08B 13/244* (2013.01); *G08B 13/2434* (2013.01); *H01P 11/008* (2013.01); *Y10T 29/49002* (2015.01); *Y10T 29/49018* (2015.01)

(58) Field of Classification Search
None
See application file for complete search history.

(56) References Cited

U.S. PATENT DOCUMENTS

| | | |
|---|---|---|
| 4,695,351 A | 9/1987 | Mallary |
| 5,351,033 A | 9/1994 | Liu et al. |

(Continued)

*Primary Examiner* — Julie Lieu
(74) *Attorney, Agent, or Firm* — Fox Rothschild LLP; Robert J. Sacco; Carol E. Thorstad-Forsyth

(57) ABSTRACT

Systems (100) and methods (1800) for making a marker housing. The methods comprise: forming a first housing portion from a flexible material so as to have a planar shape; and forming a second housing portion (700, 1200, 1500) from the flexible material so as to comprise a cavity (702, 1202) in which resonator and bias elements (104, 110) of the marker can be housed when the second housing portion is coupled to the first housing portion. The cavity is defined by two opposing short sidewalls (708, 712), two opposing elongate sidewalls (706, 710) and a bottom sidewall (704). The two opposing elongate sidewalls are stiffened such that crushing and bending thereof is made difficult. The stiffening is achieved by forming a plurality of first stiffener edge features (714) along an exterior surface of each of the two opposing elongate sidewalls which partially define the cavity of the second housing portion.

20 Claims, 13 Drawing Sheets

(51) Int. Cl.
*G08B 13/24* (2006.01)
*H01P 11/00* (2006.01)
*G06K 19/077* (2006.01)

(56) References Cited

U.S. PATENT DOCUMENTS

| | | |
|---|---|---|
| 5,469,140 A | 11/1995 | Liu et al. |
| 5,495,230 A | 2/1996 | Lian |
| 5,495,231 A | 2/1996 | Hasegawa |
| 5,539,380 A | 7/1996 | Hasegawa et al. |
| 5,565,849 A | 10/1996 | Ho et al. |
| 5,568,125 A | 10/1996 | Liu |
| 5,602,527 A | 2/1997 | Suenaga |
| 5,628,840 A | 5/1997 | Hasegawa |
| 5,650,023 A | 7/1997 | Hasegawa et al. |
| 5,676,767 A | 10/1997 | Liu et al. |
| 5,684,459 A | 11/1997 | Liu et al. |
| 5,729,200 A | 3/1998 | Copeland et al. |
| 5,763,868 A | 6/1998 | Kubota et al. |
| 5,767,770 A | 6/1998 | Gadonniex |
| 5,786,762 A | 7/1998 | Liu |
| 5,801,630 A | 9/1998 | Ho et al. |
| 5,825,290 A | 10/1998 | Lian et al. |
| 5,835,016 A | 11/1998 | Ho et al. |
| 5,870,021 A | 2/1999 | Gadonniex |
| 5,891,270 A | 4/1999 | Hasegawa |
| 5,949,334 A | 9/1999 | Lian et al. |
| 5,969,612 A | 10/1999 | Gadonniex et al. |
| 5,999,098 A | 12/1999 | Lian et al. |
| 6,011,475 A | 1/2000 | Herzer |
| 6,020,817 A | 2/2000 | Copeland et al. |
| 6,057,766 A | 5/2000 | O'Handley et al. |
| 6,067,015 A | 5/2000 | Lian et al. |
| 6,093,261 A | 7/2000 | Hasegawa et al. |
| 6,181,245 B1 | 1/2001 | Copeland et al. |
| 6,187,112 B1 | 2/2001 | Hasegawa et al. |
| 6,254,695 B1 | 7/2001 | Herzer et al. |
| 6,359,563 B1 | 3/2002 | Herzer |
| 6,426,700 B1 | 7/2002 | Lian et al. |
| 6,489,891 B1 | 12/2002 | Ho et al. |
| 6,538,572 B2 | 3/2003 | Lian et al. |
| 6,645,314 B1 | 11/2003 | Herzer et al. |
| 6,690,279 B1 | 2/2004 | Ruhrig et al. |
| 6,720,877 B2 | 4/2004 | Lian et al. |
| 6,830,634 B2 | 12/2004 | Herzer et al. |
| 7,023,345 B2 | 4/2006 | Lian et al. |
| 7,088,247 B2* | 8/2006 | Herzer ............... C21D 1/04 148/304 |
| 7,276,128 B2 | 10/2007 | Herzer et al. |
| 7,623,039 B2* | 11/2009 | Liu ............... G08B 13/2437 340/572.1 |
| 8,746,580 B2 | 6/2014 | Li |
| 2012/0085827 A1* | 4/2012 | Shute ............... B65D 73/0057 235/492 |

\* cited by examiner

ENHANCED SIGNAL AMPLITUDE IN ACOUSTIC-MAGNETOMECHANICAL EAS MARKER

CROSS REFERENCE TO RELATED APPLICATIONS

This application claims the benefit of U.S. Provisional Patent Application No. 62/009,438 filed Jun. 9, 2014 and U.S. Provisional Patent Application No. 62/015,987 filed Jun. 23, 2014, the entirety of which are incorporated herein by reference.

FIELD OF THE INVENTION

This document relates generally to Electronic Article Surveillance ("EAS") systems. More particularly, this document relates to EAS systems employing an Acoustic-MagnetoMechanical ("AMM") marker and methods of making such an AMM marker.

BACKGROUND OF THE INVENTION

A typical EAS system in a retail setting may comprise a monitoring system and at least one security tag or marker attached to an article to be protected from unauthorized removal. The monitoring system establishes a surveillance zone in which the presence of security tags and/or markers can be detected. The surveillance zone is usually established at an access point for the controlled area (e.g., adjacent to a retail store entrance and/or exit). If an article enters the surveillance zone with an active security tag and/or marker, then an alarm may be triggered to indicate possible unauthorized removal thereof from the controlled area. In contrast, if an article is authorized for removal from the controlled area, then the security tag and/or marker thereof can be deactivated and/or detached therefrom. Consequently, the article can be carried through the surveillance zone without being detected by the monitoring system and/or without triggering the alarm.

The security tag or marker generally consists of a housing. The housing is made of a low cost plastic material, such as polystyrene. The housing is typically manufactured with a drawn cavity in the form of a rectangle. This type of housing works reasonably well, but suffers from bowing and warping that result from the drawing process introducing stresses into the plastic. In addition, the cavity crushes under stress of application or bending. An improved design was created a few years ago that added fingers or wavy ends to the label. This improvement reduces issues, but does not completely eliminate the crushing and bending issues.

A bias magnet is disposed within the housing adjacent to a magnetoelastic resonator. The bias magnet is made of a semi-hard magnetic material. The resonator is made of a soft magnetic material in the form of an elongate thin ribbon produced by rapid quenching. During operation, the security tag or marker produces a resonate signal with a particular amplitude that is detectable by the monitoring system. The resonator signal's amplitude has been conventionally enhanced by increasing a width of the resonator, whereby the production cost and complexity of the resonator is undesirably increased.

SUMMARY OF THE INVENTION

The present invention concerns implementing systems and methods for making a marker housing. The methods comprise: forming a first housing portion from a flexible material so as to have a planar shape; and forming a second housing portion from the flexible material so as to comprise a cavity in which resonator and bias elements of the marker can be housed when the second housing portion is coupled to the first housing portion. The cavity is defined by two opposing short sidewalls, two opposing elongate sidewalls and a bottom sidewall. The two opposing elongate sidewalls are stiffened such that crushing and bending thereof is made difficult. The stiffening is achieved by forming a plurality of first stiffener edge features along an exterior surface of each of the two opposing elongate sidewalls which partially define the cavity of the second housing portion. Notably, the cavity of the second housing portion and the plurality of first stiffener edge features can be formed concurrently with each other.

Each first stiffener edge feature may: extend more than 50% of an entire height of a respective one of the two opposing elongate sidewalls of the second housing portion; comprise a shaped hollow or solid structure protruding out and away from the second housing portion; and have a dome shape. The first edge features are disposed along a respective one of the two opposing elongate sidewalls so as to have equal or non-equal spacing between adjacent ones thereof.

In some scenarios, a woven mesh-like structure is formed on an exterior surface of the bottom wall. Additionally or alternatively, a depression is formed in the bottom sidewall of the second housing portion which extends into the cavity. A plurality of second stiffener edge features are formed on two opposing elongate sidewalls partially defining the depression. A center axis of one of the first stiffener edge features is offset from a center axis of an adjacent one of the second stiffener edge features. At least one third stiffener edge feature may also be formed on each of two opposing short sidewalls partially defining the depression.

DESCRIPTION OF THE DRAWINGS

Embodiments will be described with reference to the following drawing figures, in which like numerals represent like items throughout the figures, and in which.

DETAILED DESCRIPTION OF THE INVENTION

Figure 1:
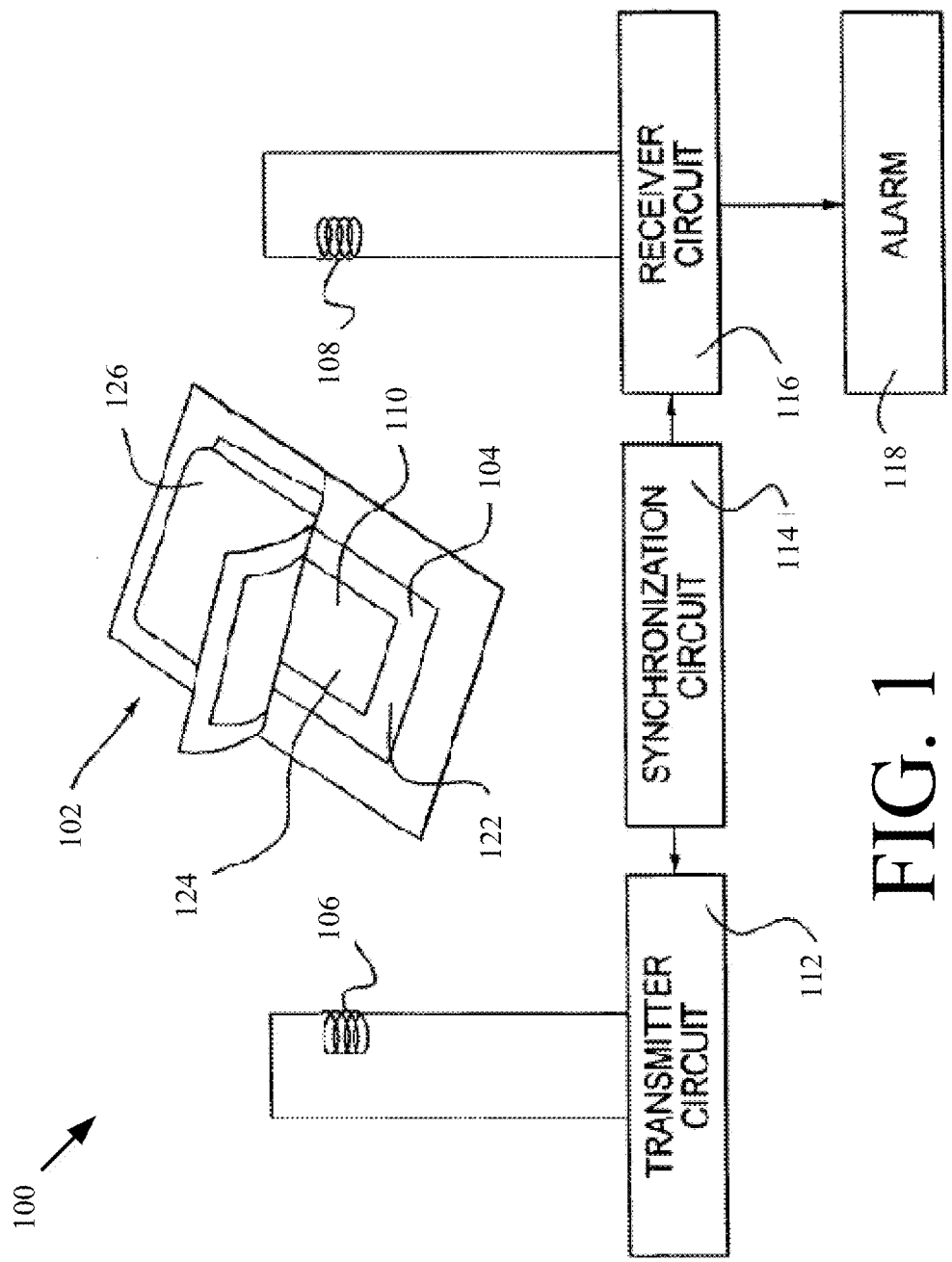
FIG. 1 is a perspective view of an exemplary EAS system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Embodiments of the present invention will now be described with respect to FIGS. 1-6. The present invention generally relates to novel systems and methods for making a marker. The marker may include, but is not limited to, an EAS label attachable to an article to be protected from unauthorized removal from a particular area. The methods involve: obtaining a resonator material which has been annealed under a tensile force selected to provide a maximum resonant amplitude at a bias field $H_{max}$; and providing by the bias material of the marker an operating bias field $H_{operating}$ with a value less than a value of the bias field $H_{max}$. The value of the bias field $H_{max}$ is reduced by performing at least one of the following operations: selectively modifying a geometry of a bias material which is to be disposed in a housing of the marker; selectively modifying a spacing between the resonator material and the bias material arranged in a stacked configuration; and partially de-gaussing the bias material subsequent to being fully saturated.

Notably, the security tags and detachers (or external tools) of the present invention can be used in a variety of applications. For example, the present invention can be used in an EAS system for detecting the unauthorized removal of articles from a particular area or space. EAS systems are well known in the art, and therefore will not be described herein.

EAS System

Referring now to FIGS. 1-6, there is provided schematic illustrations useful for understanding an exemplary EAS system 100 in accordance with the present invention. The EAS system 100 comprises a monitoring system 106-112, 114-118 and at least one marker 102. The marker 102 may be attached to an article to be protected from unauthorized removal from a business facility (e.g., a retail store). The monitoring system comprises a transmitter circuit 112, a synchronization circuit 114, a receiver circuit 116 and an alarm 118.

During operation, the monitoring system 106-112, 114-118 establishes a surveillance zone in which the presence of the marker 102 can be detected. The surveillance zone is usually established at an access point for the controlled area (e.g., adjacent to a retail store entrance and/or exit). If an article enters the surveillance zone with an active marker 102, then an alarm may be triggered to indicate possible unauthorized removal thereof from the controlled area. In contrast, if an article is authorized for removal from the controlled area, then the marker 102 can be deactivated and/or detached therefrom. Consequently, the article can be carried through the surveillance zone without being detected by the monitoring system and/or without triggering the alarm 118.

The operations of the monitoring system will now be described in more detail. The transmitter circuit 112 is coupled to the antenna 106. The antenna 106 emits Radio Frequency ("RF") bursts at a predetermined frequency (e.g., 58 KHz) and a repetition rate (e.g., 60 Hz), with a pause between successive bursts. In some scenarios, each RF burst has a duration of about 1.6 ms. The transmitter circuit 112 is controlled to emit the aforementioned RF bursts by the synchronization circuit 114, which also controls the receiver circuit 116. The receiver circuit 116 is coupled to the antenna 108. The antenna 106, 108 comprises close-coupled pick up coils of N turns (e.g., 100 turns), where N is any number.

When the marker 102 resides between the antennas 106, 108, the RF bursts transmitted from the transmitter 112, 108 cause a signal to be generated by the marker 102. In this regard, the marker 102 comprises a resonator 110 and a bias element 104 disposed in a housing 126. The RF bursts emitted from the transmitter 112, 108 drive the resonator 110 to oscillate at a resonant frequency (e.g., 58 KHz). As a result, a signal is produced with an amplitude that decays exponentially over time.

The synchronization circuit 114 controls activation and deactivation of the receiver circuit 116. When the receiver circuit 116 is activated, it detects signals at the predetermined frequency (e.g., 58 KHz) within first and second detection windows. In the case that an RF burst has a duration of about 1.6 ms, the first detection window will have a duration of about 1.7 ms which begins at approximately 0.4 ms after the end of the RF burst. During the first detection window, the receiver circuit 116 integrates any signal at the predetermined frequency which is present. In order to produce an integration result in the first detection window which can be readily compared with the integrated signal from the second detection window, the signal emitted by the marker 102 should have a relatively high amplitude (e.g., greater than or equal to about 1.5 nWb).

After signal detection in the first detection window, the synchronization circuit 114 deactivates the receiver circuit 116, and then re-activates the receiver circuit 116 during the second detection window which begins at approximately 6 ms after the end of the aforementioned RF burst. During the second detection window, the receiver circuit 116 again looks for a signal having a suitable amplitude at the predetermined frequency (e.g., 58 kHz). Since it is known that a signal emanating from the marker 102 will have a decaying amplitude, the receiver circuit 116 compares the amplitude of any signal detected at the predetermined frequency during the second detection window with the amplitude of the signal detected during the first detection window. If the amplitude differential is consistent with that of an exponentially decaying signal, it is assumed that the signal did, in fact, emanate from a marker between antennas 106, 108. In this case, the receiver circuit 116 issues an alarm 118.

Resonator and Bias Elements

The amplitude of the marker 102 is at least partially a result from the materials used to form the resonator 110 and the bias element 104. The resonator 110 can be formed of any suitable resonator material. An exemplary suitable resonator material is made from Fe, Co and Ni as main elements. Thus, the resonator material can have a chemical composition of $Fe_aCo_bNi_cSi_dB_e$, wherein a, b, c, d and e are in atomic percent. The values of a-e can respectively fall within the following ranges: 22≤a≤36; 10≤b≤13; 43≤c≤49; 1≤d≤4; and 15≤e≤17. For example, the resonator material may have a chemical composition $Fe_{24}Co_{12}Ni_{46}Si_2B_{16}$. The atomic percentages for Fe, Co and Ni may vary approximately ±5% from the stated values for atomic percent.

The resonator material may be rapidly quenched and annealed prior to assembly of the marker 102. The manner in which the resonator material is quenched can be the same as or similar to that disclosed in U.S. Pat. Nos. 4,142,571 ("the '571 patent") and 7,088,246 ("the '246 patent), the disclosures of which are incorporated herein by reference. The manner in which the resonator material is annealed can be the same as or similar to that disclosed in U.S. Pat. No. 6,645,314 ("the '314 patent"), the disclosure of which is incorporated herein by reference.

For example, in some scenarios, the resonator material is annealed (subsequent to rapid quenching) at a temperature between 340° C. and 400° C. for a few seconds (e.g., 5-30 sec.) under a tensile force. The tensile force is used to control the material's amplitude. In turn, the material's amplitude is controlled such that it reaches its maximum value at a bias field $H_{MAX}$ (e.g., 7.7 Oe or 6.5 Oe). To reduce the value of the bias field $H_{Max}$, a relatively low tensile force (e.g., 10-20 N) is employed during annealing.

Figure 2:
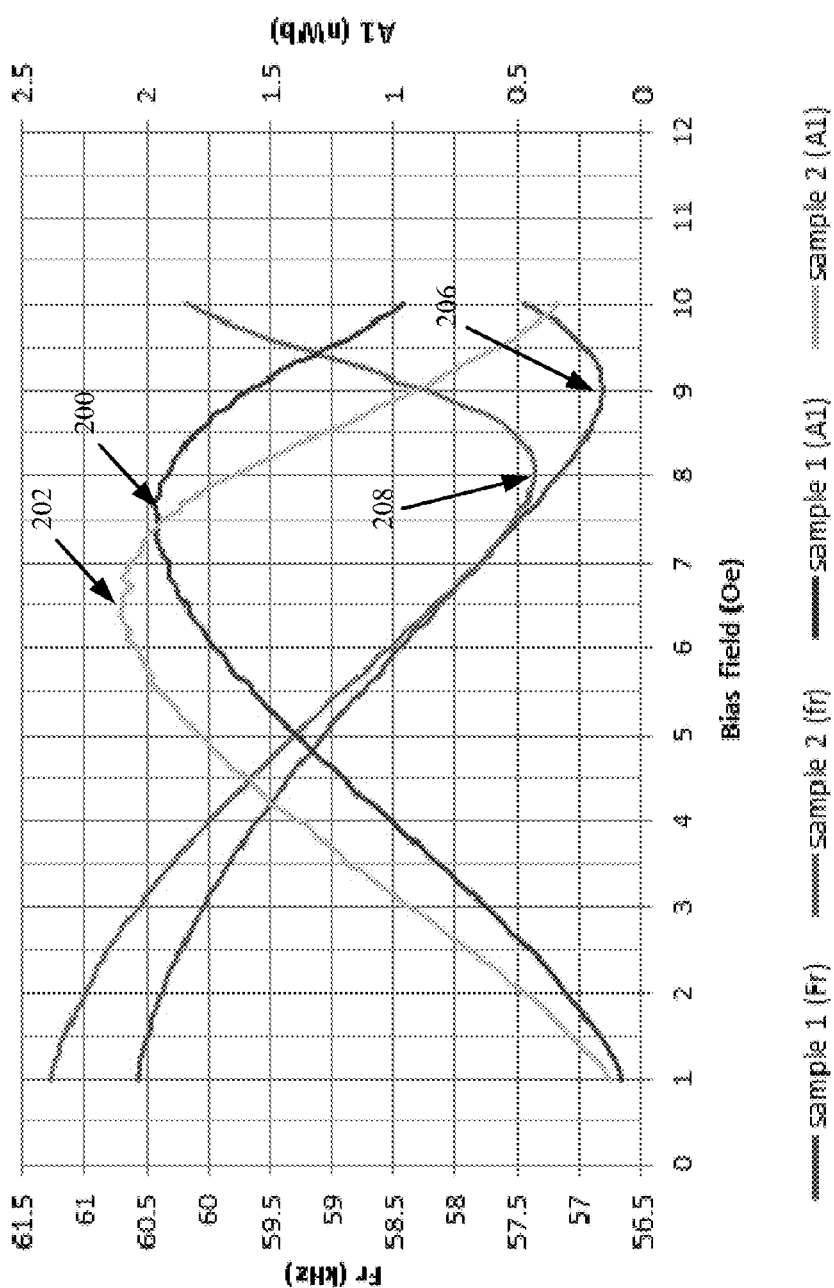
FIG. 2 is a graph showing bias sweep curves for two samples of resonator material which have the same chemical composition, but which were annealed at different conditions.

FIG. 2 shows bias sweep curves for two samples with the same chemical composition, but annealed with different conditions. As shown in FIG. 2, the bias field value $H_{MAX}$ for a first sample equals 7.7 Oe (as shown by reference number 200) and the anisotropy field $H_k$ is 9 Oe (as shown by reference number 206). The bias field value $H_{MAX}$ for a second sample equals 6.5 Oe (as shown by reference number 200) and the anisotropy field $H_k$ is 8 Oe (as shown by reference number 208). The reduction of the bias field value $H_{MAX}$ for the second sample enables a corresponding marker to operate at a low bias field (e.g., 6.5 Oe), whereby magnetic clamping is relieved. As a result, the maximum resonant amplitude of the signal emitted from the corresponding marker is increased as compared to that of a marker comprising the first sample material (e.g., from about 1.0 nWb to about 1.5 nWb).

The bias field value $H_{operating}$ is further reduced when the marker 102 is assembled and/or magnetized. To further reduce the bias field value $H_{operating}$, the geometry of the bias element 104 can be modified and/or the distance between components 104, 110 can be increased. The same purpose is achieved by applying a reverse Direct Magnetic ("DM") field to partially de-Gauss a fully saturated bias material. Each of the listed techniques for further reducing the bias field value $H_{operating}$ will be described in detail below.

Figure 3:
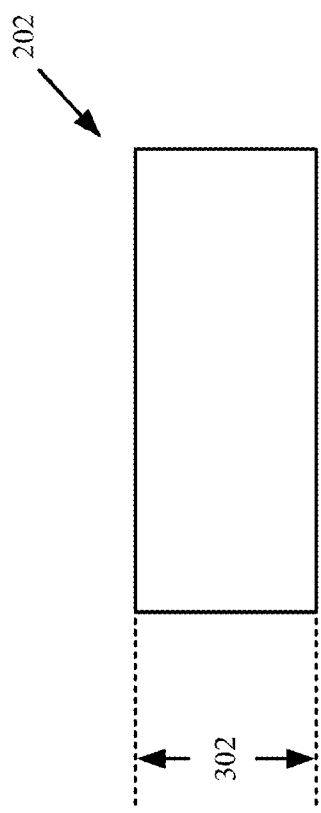
FIG. 3 is top view of the resonator shown in FIG. 1.
Figure 4:
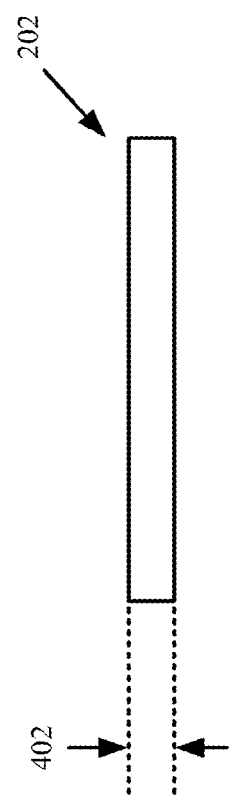
FIG. 4 is a side view of the resonator shown in FIG. 1.

As shown in FIGS. 1, 3 and 4, the bias element 104 has a generally rectangular shape. Thus, its geometry can be modified by decreasing its width 302 and/or its thickness 402. In conventional EAS systems, the bias element of a marker has a width of about 6 mm and a thickness of about 48 microns. In contrast, the geometry of the bias element 104 may be modified such that it has a width 302 of less than 6 mm (e.g., about 5 mm) and/or a thickness 402 less than 48 microns (e.g., about 40 microns). Such geometry modifications of the bias element 104 may result in a decrease of the marker's operating bias field $H_{operating}$ from e.g., 6.5 Oe to e.g., 5.5 Oe.

Figure 5:
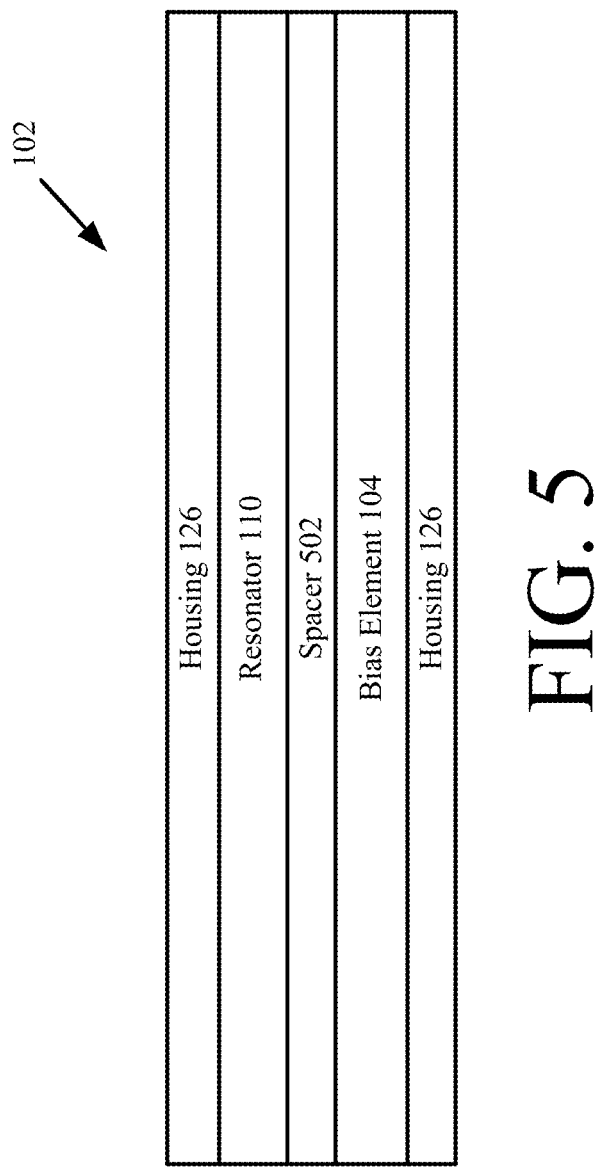
FIG. 5 is a partial cross-section of the marker shown in FIG. 1.

As shown in FIG. 5, the marker 102 comprises a plurality of material layers defining components 104, 110, 126, 502. The resonator 110 and bias element 104 reside between two housing 126 layers. The bias element 104 is disposed below the resonator 110 in a stacked arrangement. A spacer 502 may optionally be provided between the resonator 110 and bias element 104. The spacer 502 is formed of any suitable material, such as plastic. The thickness of the spacer 502 is selected to further decrease the marker's operating bias field $H_{operating}$ from e.g., 6.5 Oe to e.g., 5.5 Oe. In conventional systems, the spacer has a thickness of 10 mils. In contrast, the spacer 502 of the present invention can have a thickness greater than 10 mils if it is desirable to obtain a lower operating bias field $H_{operating}$.

Figure 6:
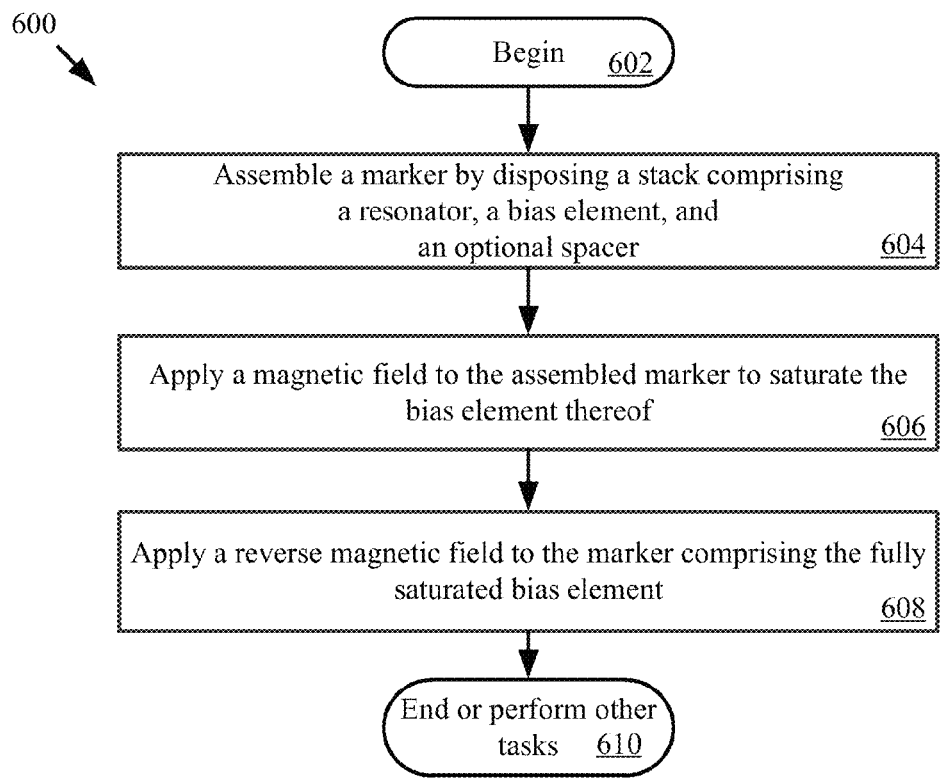
FIG. 6 is flow diagram of a method for reducing an operating bias field strength that is useful for understanding the present invention.

As noted above, the operating bias field $H_{operating}$ can be further reduced through an application of a reverse DM field to a fully saturated bias element. An exemplary method 600 is shown in FIG. 6 that is useful for understanding this feature of the present invention. As shown in FIG. 6, the method 600 begins with step 602 and continues with step 604. In step 604, a marker (e.g., marker 102 of FIG. 1) is assembled. Such assembly involves disposing a stack in a housing (e.g., housing 126 of FIG. 1). The stack comprises a resonator (e.g., resonator 110 of FIG. 1), and an optional spacer (e.g., spacer 502 of FIG. 5).

Once the marker has been fully assembled, a magnetic field is applied thereto for purposes of saturating the bias element material, as shown by step 606. Techniques for saturating a bias element material are well known in the art, and therefore will not be described herein. Next in step 608, a reverse DM field is applied to the marker with the fully saturated bias element material. Techniques for applying a reverse DM field to an object are well known in the art, and any known method can be used herein without limitation. For example, the reverse DM field can be applied using a coil or a magnet in a direction that is the reverse of the direction in which the magnetic field was previously applied to saturate the bias material. Upon completing step 608, step 610 is performed where method 600 ends or other tasks are performed.

The following Table 1 shows test results of tests performed using the second sample referred to above in relation to FIG. 2 to further reduce a bias field strength of a marker in accordance with the various techniques described above.

| Configuration | | | | | |
|---|---|---|---|---|---|
| Bias Width | Spacer | Amplitude (nWb) | Frequency (kHz) | Q | Notes |
| 5 mm | 0 mm | 1.52 | 58.589 | 405 | |
| 6 mm | 0 mm | 1.08 | 58.684 | 399 | Conventional Label Design |
| 6 mm | 0 mm | 1.50 | 58.113 | 347 | 10 Oe DC de-gaussed |
| 6 mm | 0.19 mm | 1.46 | 58.276 | 358 | Paper spacer between bias |
| 6 mm | 0.39 mm | 1.62 | 58.356 | 392 | element and resonator |

As shown in Table 1, the signal amplitude increases by about 50% (e.g., changes from 1.08 nWb to >1.46 nWb) in other design formats as the operating bias field $H_{operating}$ is reduced. In addition to or alternative to the above described techniques for reducing the operating bias field $H_{operating}$, multiple resonators may be disposed in a marker whereby the signal amplitude is increased.

Marker Housing

The marker is shown in FIG. 1 as having a particular housing architecture. Embodiments of the present invention are not limited to the housing architecture shown in FIG. 1. As such, additional alternative housing architectures will now be discussed which can be used with the present invention without limitation.

Notably, each of the additional alternative housing architectures comprise stiffener edge features (e.g., ribs, protrusions and/or dimples) that stiffen the marker considerably from previous marker designs, such as that discussed above in the background section of this paper. The new marker design greatly improves the rigidity of the plastic and significantly improves the label performance both under crush conditions and bending conditions. In addition, the yield in the factory improves because the markers remain flat after forming. Previously, a few percent of the markers were "dead" (non-performing) due to warping in the cavity (e.g., cavity 702 of FIG. 7) during manufacturing. Furthermore, the stiffener edge features allow the housing thickness to be reduced as compared to that of conventional marker housings, thereby reducing the manufacturing costs of the markers without having any decreased performance thereof. The stiffener edge features facilitate improved performance of the markers via an increase in their signal's amplitude.

Figure 7:
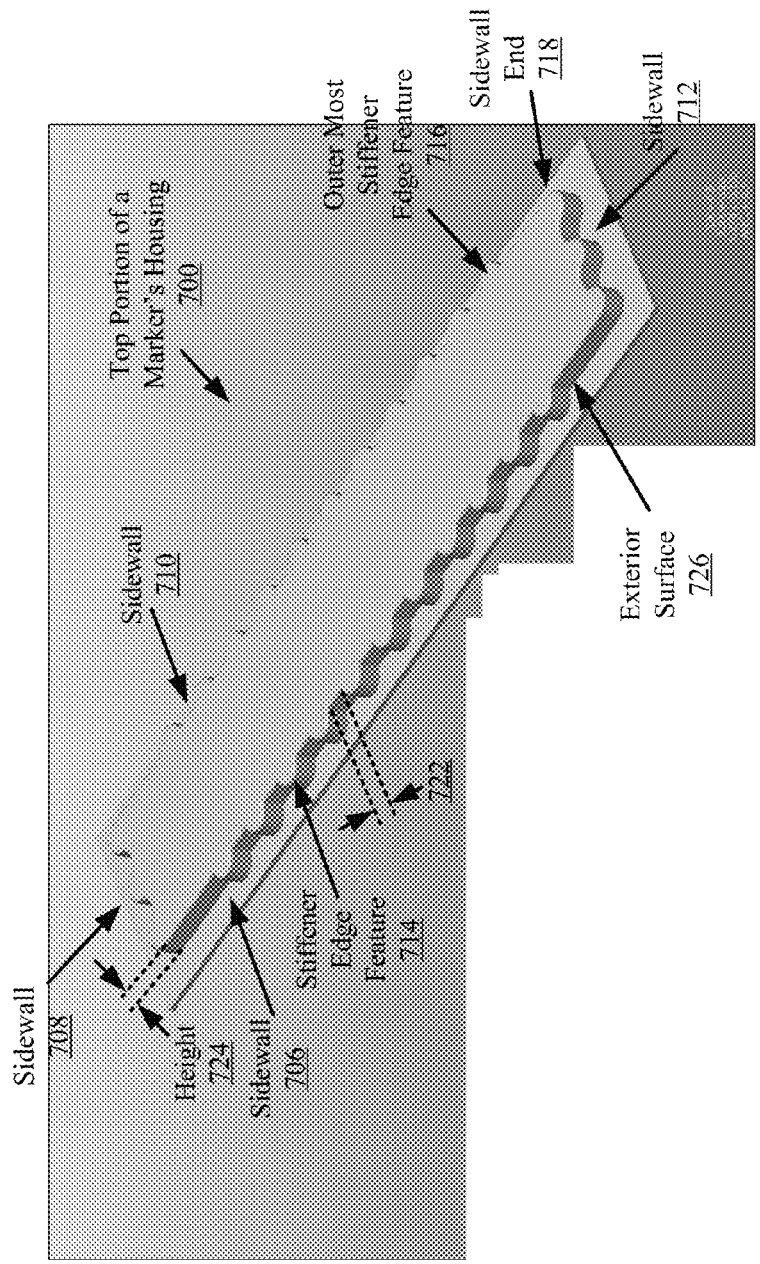
FIGS. 7-17 each provide a schematic illustration of an exemplary architecture for a marker's housing.
Figure 8:
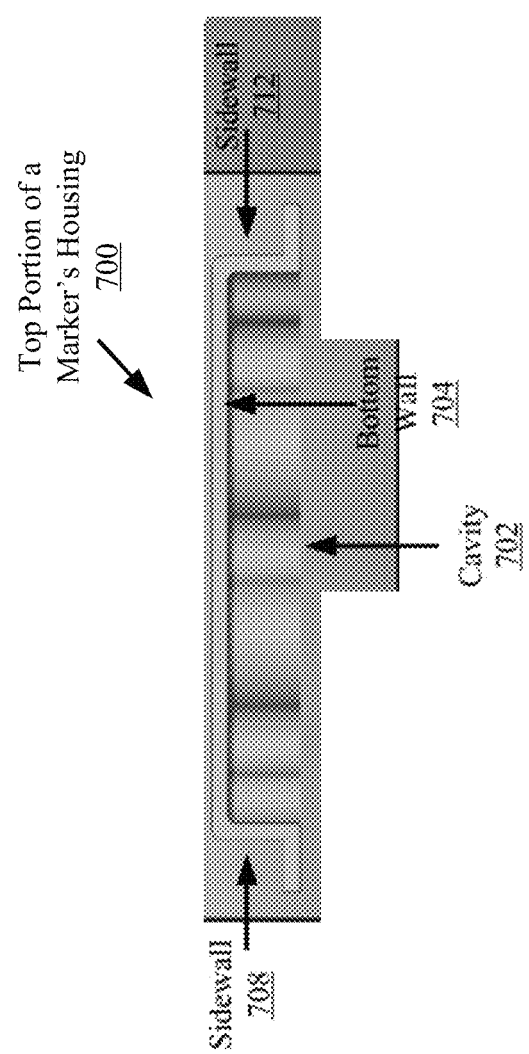
Figure 9:
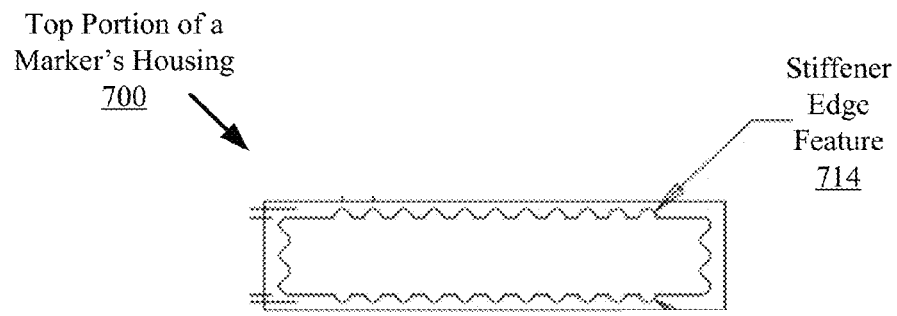
Figure 10:
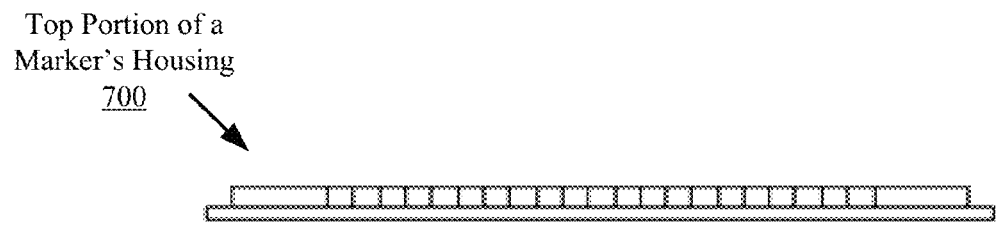
Figure 11:
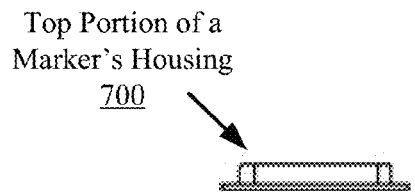

Referring now to FIGS. 7-11, there is provided various schematic illustrations of an exemplary architecture for a top portion 700 of a marker's housing. More particularly, FIG. 7 provides a perspective view of the top portion 700. A cross-sectional view of the top portion 700 is provided in FIG. 8. A top view of the top portion 700 is provided in FIG. 9. A side view of the top portion 700 is provided in FIG. 10. A front view of the top portion 700 is provided in FIG. 11.

Notably, the bottom portion (not shown) of the marker's housing is generally a flat panel which is coupled to the top portion 700 at least along the entire peripheral edge thereof (e.g., via an adhesive or heat weld). The top and bottom portions of the marker housing are formed of a flexible material, such as plastic (e.g., polystyrene). A single sheet of flexible material can be used to form top portions and/or bottom portions for a number of marker housings (e.g., 20 marker housings). With regard to the top portion 700, the single sheet of the flexible material is shaped through the application of heat and/or pressure thereto so as to cause the sheet to conform to the shape of a mold. The mold may be designed such that: a number of top portions 700 are fabricated at the same time from a single sheet of housing material; and various elements of the top portion are formed concurrently with each other (e.g., a cavity and a plurality of stiffener edge features).

As shown in FIG. 7, the top portion 700 has a generally rectangular shape with a cavity 702 formed therein. The cavity 702 is sized and shaped to receive the resonator and bias elements described above. When the top and bottom portions of a marker's housing are coupled together, the resonator and bias elements are said to be housed in the marker's housing.

As also shown in FIG. 7, a bottom wall 704 of the cavity is flat or planar. In contrast, each of the four sidewalls 706-712 has a non-planar shape. More particularly, each short sidewall 708, 712 has a generally serpentine shape. Each elongate sidewall 706, 710 has a non-planar shape defined by at least one stiffener edge feature 714 formed therein (or along an exterior surface 726 thereof). The stiffener edge features 714 serve to strengthen the marker housing by increasing the crush resistance and bend resistance of the elongate sidewalls 706, 710. As such, each stiffener edge feature 714 extends a certain percentage of the height 724 of the respective sidewall 706-712 (e.g., 50-100%). Each stiffener edge feature may be a hollow or solid structure. In addition, the overall thickness of the marker housing is reduced. In effect, the cost associated with fabricating the marker housing is also reduced without any performance degradation of the marker.

In this regard, each stiffener edge feature 714 comprises a protrusion/rib extending in a direction out and away from the housing material, a dimple extending in a direction out and away from the housing material, or a dimple extending in a direction towards the center of the housing. The stiffener edge features on each elongate sidewall 706, 710 can be of the same or different types. For example, the stiffener edge features of sidewalls 706 and 710 can be of the same type as shown in FIG. 7, i.e., convex dimples 714 extending out and away from the housing material. However, the stiffener edge features of sidewalls 706 and 710 can be of two different types although not shown, i.e., convex dimples 714 extending out and away from the housing material and concave dimple extending in and towards the center of the housing. In all scenarios, each stiffener edge feature 714 may have a dome shape as shown in FIG. 7, a square shape, a rectangular shape, a triangular shape or any other shape suitable for providing structural strength to the marker housing.

Any number of stiffener edge features 714 can be provided on each elongate sidewall 706, 710 of the top portion 700. For example, eleven stiffener edge features 714 are provided on each sidewall 706 and 710. The present invention is not limited to the particular numbers of stiffener edge features shown in FIG. 7.

The stiffener edge features on each elongate sidewall 706, 710 can have equal spacing therebetween or non-equal spacing therebetween. For example, the spacing between adjacent stiffener edge features 714 of each sidewall 706, 710 is the same for all adjacent pairs of edge features thereof. The spacing between the stiffener edge features of each sidewall can be the same as or different than that of the other sidewalls. For example, the stiffener edge features 714 of sidewall 706 are spaced apart by a particular distance 722 (e.g., approx. 0.1 inches). The spacing between the outer most edge features 716 of each sidewall and the respective sidewall end 718 can be the same or different for each sidewall.

Figure 12:
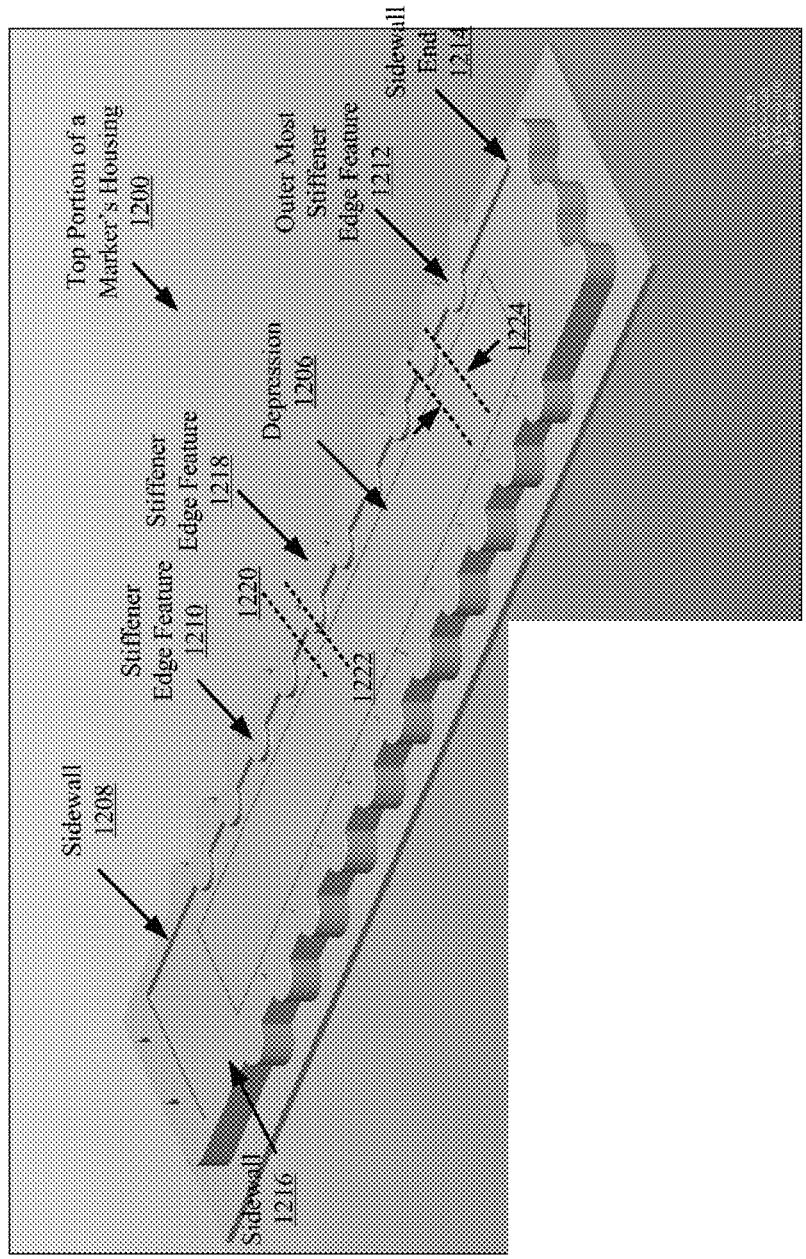
Figure 13:
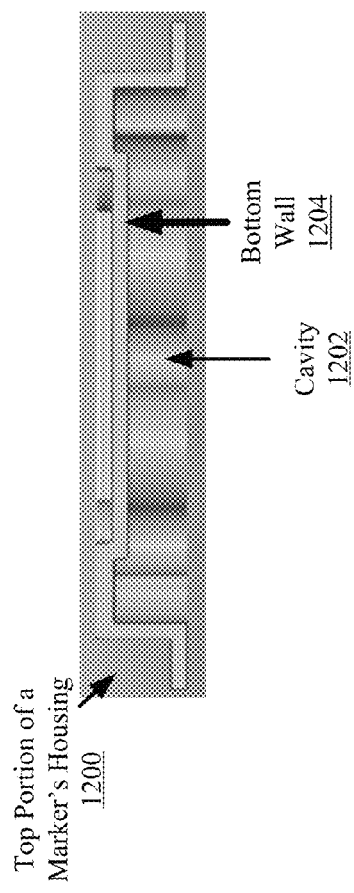
Figure 14:
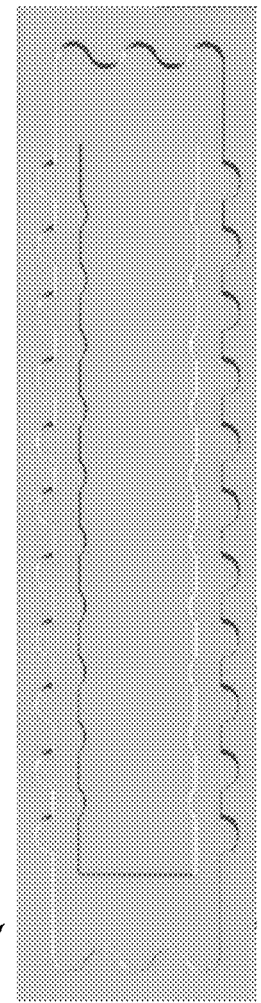

Referring now to FIGS. 12-14, there are various schematic illustrations of another exemplary architecture for a top portion 1200 of a marker's housing. More particularly, FIG. 12 provides a perspective view of the top portion 1200. FIG. 13 provides a cross sectional view of the top portion 1200. FIG. 14 provides a top view of the top portion 1200.

Notably, top portion 1200 is the same as or substantially similar to top portion 700 with a few exceptions which will be described below. As such, the discussion provided above in relation to FIGS. 7-11 is suitable for understanding the general architecture of top portion 1200 (especially the stiffener edge features formed on the elongate sidewalls thereof).

As shown in FIG. 12, the bottom wall 1204 of the cavity 1202 is non-planar as opposed to planar (as shown in FIG. 7). In this regard, the bottom wall 1204 has a depression 1206 formed therein. The depression 1206 can have any shape and/or size selected in accordance with a particular application. For example, the depression 1206 has a generally rectangular shape, and extends into the cavity 1202.

The two elongate sidewalls 1208, 1216 of the depression 1206 each have stiffener edge features 1210 formed thereon. Each stiffener edge feature 1210 comprises a protrusion, ridge or dimple extending in a direction towards the center of the housing (as shown in FIG. 12). The stiffener edge features on each sidewall 1208, 1216 can be of the same or different types. In all scenarios, each stiffener edge feature 1210 may have a dome shape as shown in FIG. 12, a square shape, a rectangular shape, a triangular shape or any other shape suitable for providing structural strength to the marker housing.

Also, a center axis 1222 of each stiffener edge feature 1210 is offset from a center axis 1220 of adjacent stiffener edge features 1218 such that the stiffener edge features 1210, 1218 have a generally alternating pattern along the length of the respective side of the top portion 1200. In some cases, the adjacent stiffener edge features 1210 and 1218 do not overlap each other at all. However, in other scenarios, at least a portion of the adjacent stiffener edge features 1210 and 1218 overlap each other (e.g., by no less than 10% of their overall width 1224). This offset arrangement allows the spacing between adjacent stiffener edge features 1210 to be the same as or different than the spacing between adjacent stiffener edge features 1218.

Any number of stiffener edge features 1210 can be provided on each sidewall 1208, 1216 of the depression 1206. The stiffener edge features 1210 on each sidewall can have equal spacing therebetween or non-equal spacing therebetween. The spacing between the stiffener edge features 210 of each sidewall 1208, 1216 can be the same as or different than that of the other sidewalls. The spacing between the outer most edge features 1212 of each sidewall 1208, 1216 and the respective sidewall end 1214 can be the same or different for each sidewall.

Figure 15:
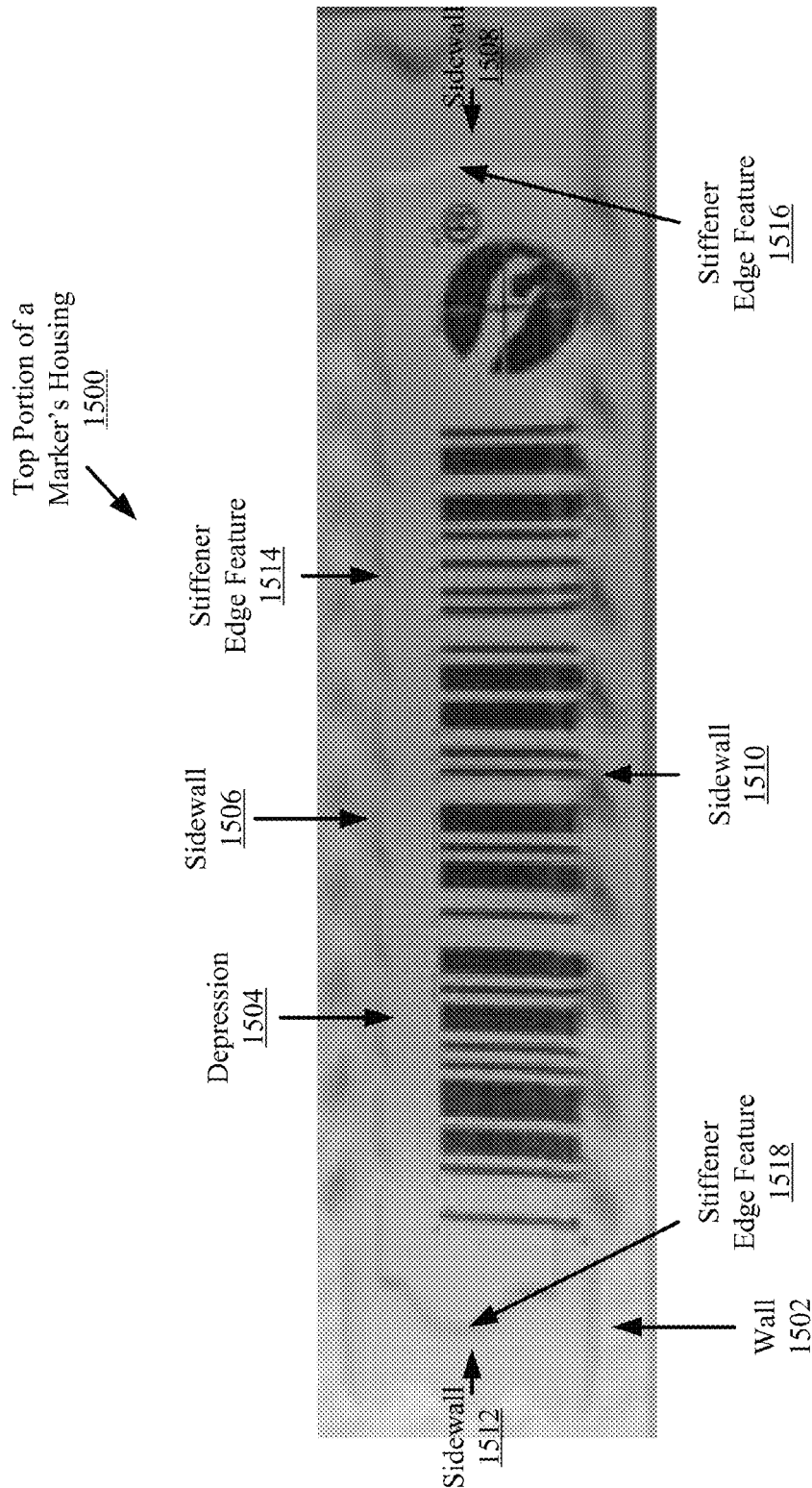

Referring now to FIG. 15, there is provided a schematic illustration of another exemplary architecture for a top portion 1500 of a marker's housing. Top portion 1500 is the same as or substantially similar to top portions 700, 1200 with a few exceptions which will be described below. As such, the discussion provided above in relation to FIGS. 7-14 is suitable for understanding the general architecture of top portion 1500 (especially the stiffener edge features formed on the elongate sidewalls thereof).

As shown in FIG. 15, a wall 1502 of the top portion 1500 is non-planar as opposed to planar (as shown in FIG. 7). In this regard, the wall 1502 has a depression 1504 formed therein. The depression 1504 can have any shape and/or size selected in accordance with a particular application. For example, the depression 1504 has a generally rectangular shape, and extends into the cavity (not shown in FIG. 15).

All four sidewalls 1506-1512 of the depression 1504 have at least one stiffener edge feature 1514, 1516 or 1518 formed thereon. Each stiffener edge feature comprises a protrusion, rib, dimple or indent. The stiffener edge features on each sidewall can be of the same or different types. For example, the stiffener edge features 1514 on sidewalls 1506 and 1510 comprise convex ribs extending in a direction towards the center of the housing. In contrast, the stiffener edge features 1516, 1518 of sidewalls 1508, 1512 comprise indents extending in a direction away from the center of the housing. In all scenarios, each stiffener edge feature may have a dome shape as shown in FIG. 15, a square shape, a rectangular shape, a triangular shape or any other shape suitable for providing structural strength to the marker housing. Some or all of the dome shaped stiffener edge features can have the same or different radii.

Any number of stiffener edge features can be provided on each sidewall 1506-1512 of the depression 1504. For example, ten stiffener edge features 1514 are provided on each sidewall 1506 and 1510. In contrast, a single stiffener edge feature 1516 or 1518 is provided an each sidewall 1508 and 1512. The stiffener edge features on each sidewall can have equal spacing therebetween or non-equal spacing therebetween. The spacing between the stiffener edge features of each sidewall can be the same as or different than that of the other sidewalls. The spacing between the outer most stiffener edge features of each sidewall and the respective sidewall end can be the same or different for each sidewall.

Figure 16:
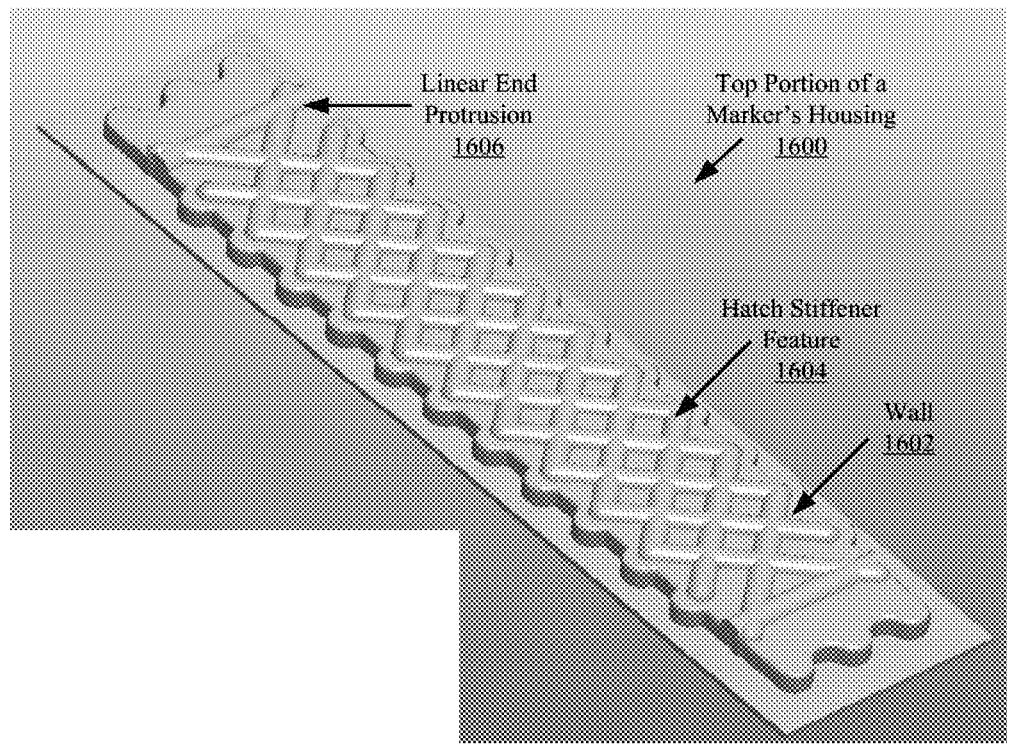
Figure 17:
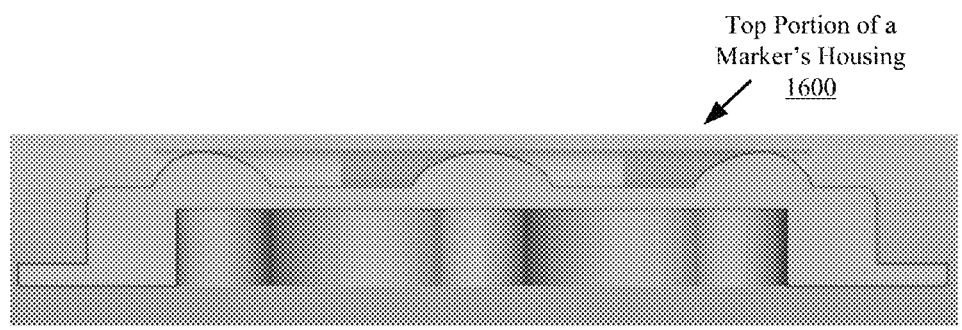

Referring now to FIGS. 16-17, there is provided a schematic illustration of another exemplary architecture for a top portion 1600 of a marker's housing. Top portion 1600 is the same as or substantially similar to top portions 700 with a few exceptions which will be described below. As such, the discussion provided above in relation to FIGS. 7-11 is suitable for understanding the general architecture of top portion 1600 (especially the stiffener edge features formed on the elongate sidewalls thereof).

As shown in FIGS. 16-17, the top portion 1600 includes wall 1602 having a hatch stiffener feature 1604 formed thereon. The hatch stiffener feature 1604 comprises a plurality of linear protrusions which extend out and away from the wall 1602. The linear protrusions are arranged relative to each other so as to collectively form a woven mesh-like structure. Ends of the woven mesh-like structure may be respectively crossed by linear end protrusions 1606. The woven mesh-like structure and linear end protrusions 1606 provide additional strength to the wall 1602.

Figure 18:
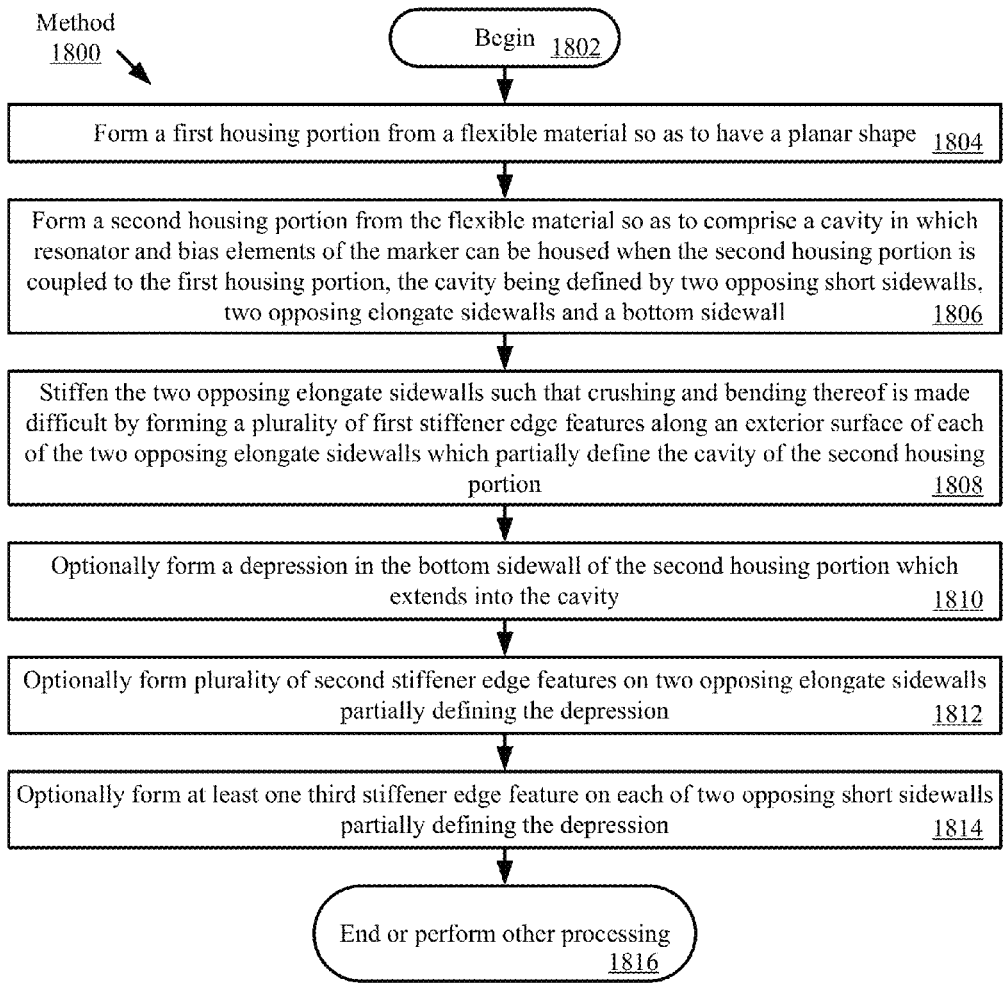
FIG. 18 is a flow diagram of an exemplary method for making a marker housing.

Referring now to FIG. 18, there is provided a flow diagram of an exemplary method 1800 for making a marker housing. Method 1800 begins with step 1802 and continues with step 1804. Step 1804 involves forming a first housing portion from a flexible material so as to have a planar shape. Next in step 1806, a second housing portion is formed from the flexible material so as to comprise a cavity in which resonator and bias elements of the marker can be housed when the second housing portion is coupled to the first housing portion. The cavity is defined by two opposing short sidewalls, two opposing elongate sidewalls and a bottom sidewall.

The two opposing elongate sidewalls are stiffened in step 1808 such that crushing and bending thereof is made difficult. The stiffening is achieved by forming a plurality of first stiffener edge features along an exterior surface of each of the two opposing elongate sidewalls which partially define the cavity of the second housing portion. The first edge features are disposed along a respective one of the two opposing elongate sidewalls so as to have equal or non-equal spacing between adjacent ones thereof. Each of the first stiffener edge features may: extend more than 50% of an entire height of a respective one of the two opposing elongate sidewalls of the second housing portion; comprise a shaped hollow or solid structure protruding out and away from the second housing portion; and/or have a dome shape.

After completing step 1808, method 1800 may continue with one or more optional steps 1810-1814. In step 1810, a depression is optionally formed in the bottom wall of the second housing portion which extends into the cavity. A plurality of second stiffener edge features may optionally be formed on two opposing elongate sidewalls partially defining the depression, as shown by step 1812. In this case, a center axis of one of the first stiffener edge features is offset from a center axis of an adjacent one of the second stiffener edge features. At least one third stiffener edge feature may optionally be formed on each of two opposing short sidewalls partially defining the depression, as shown by step 1814. Upon completing step 1814, step 1816 is performed where method 1800 ends or other processing is performed.

Notably, the cavity of the second housing portion, the first stiffener edge features, the depression, the second stiffener edge features and the third stiffener edge feature can be formed concurrently with each other. As such, steps 1806-1814 can be performed simultaneously or concurrently with each other.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method of making a marker housing, comprising:
   forming a first housing portion from a flexible material so as to have a planar shape;
   forming a second housing portion from the flexible material so as to comprise a cavity in which resonator and bias elements of the marker can be housed when the second housing portion is coupled to the first housing portion, the cavity being defined by two opposing short sidewalls, two opposing elongate sidewalls and a bottom sidewall; and
   stiffening the two opposing elongate sidewalls such that crushing and bending thereof is made difficult by forming a plurality of first stiffener edge features along an exterior surface of each of the two opposing elongate sidewalls which partially define the cavity of the second housing portion.

2. The method according to claim 1, wherein the cavity of the second housing portion and the plurality of first stiffener edge features are formed concurrently with each other.

3. The method according to claim 1, wherein each of said first stiffener edge features extends more than 50% of an entire height of a respective one of the two opposing elongate sidewalls of the second housing portion.

4. The method according to claim 1, wherein each of said first stiffener edge features comprises a shaped hollow or solid structure protruding out and away from the second housing portion.

5. The method according to claim 1, wherein first edge features of the plurality of first stiffener edge features are disposed along a respective one of the two opposing elongate sidewalls so as to have equal or non-equal spacing between adjacent ones thereof.

6. A method of making a marker housing, comprising:
   forming a first housing portion from a flexible material so as to have a planar shape;
   forming a second housing portion from the flexible material so as to comprise a cavity in which resonator and bias elements of the marker can be housed when the second housing portion is coupled to the first housing portion, the cavity being defined by two opposing short sidewalls, two opposing elongate sidewalls and a bottom sidewall; and
   stiffening the two opposing elongate sidewalls such that crushing and bending thereof is made difficult by forming a plurality of first stiffener edge features along an exterior surface of each of the two opposing elongate sidewalls which partially define the cavity of the second housing portion;
   wherein each of the first stiffener edge features has a dome shape.

7. The method according to claim 1, further comprising forming a depression in the bottom sidewall of the second housing portion which extends into the cavity.

8. The method according to claim 7, further comprising forming a plurality of second stiffener edge features on two opposing elongate sidewalls partially defining the depression.

9. The method according to claim 8, wherein a center axis of one of the first stiffener edge features is offset from a center axis of an adjacent one of the second stiffener edge features.

10. The method according to claim 7, further comprising forming at least one third stiffener edge feature on each of two opposing short sidewalls partially defining the depression.

11. The method according to claim 1, further comprising forming a woven mesh-like structure on an exterior surface of the bottom wall.

12. A marker housing, comprising:
    a first housing portion formed of a flexible material having a planar shape;
    a second housing portion formed from the flexible material so as to comprise a cavity in which resonator and bias elements of the marker can be housed when the second housing portion is coupled to the first housing portion, the cavity being defined by two opposing short sidewalls, two opposing elongate sidewalls and a bottom sidewall; and
    a plurality of protrusions formed along an exterior surface of each opposing elongate sidewall of the second housing portion which partially defines the cavity, whereby the marker housing is stiffened such that crushing and bending thereof is made difficult.

13. The marker housing according to claim 12, wherein the cavity of the second housing portion and a plurality of first stiffener edge features are formed concurrently with each other.

14. The marker housing according to claim 12, wherein each of said first stiffener edge features extends more than 50% of an entire height of a respective one of the two opposing elongate sidewalls of the second housing portion.

15. A marker housing, comprising:
a first housing portion formed of a flexible material having a planar shape;
a second housing portion formed from the flexible material so as to comprise a cavity in which resonator and bias elements of the marker can be housed when the second housing portion is coupled to the first housing portion, the cavity being defined by two opposing short sidewalls, two opposing elongate sidewalls and a bottom sidewall; and
a plurality of protrusions formed along an exterior surface of each opposing elongate sidewall of the second housing portion which partially defines the cavity, whereby the marker housing is stiffened such that crushing and bending thereof is made difficult;
wherein each of said first stiffener edge features comprises a shaped hollow or solid structure protruding out and away from the second housing portion.

16. The marker housing according to claim 12, wherein first edge features of the plurality of first stiffener edge features are disposed along a respective one of the two opposing elongate sidewalls so as to have equal or non-equal spacing between adjacent ones thereof.

17. The marker housing according to claim 12, wherein each of the first stiffener edge features has a dome shape.

18. The marker housing according to claim 12, further comprising a depression formed in the bottom sidewall of the second housing portion which extends into the cavity.

19. The marker housing according to claim 18, further comprising a plurality of second stiffener edge features formed on two opposing elongate sidewalls partially defining the depression.

20. The marker housing according to claim 19, wherein a center axis of one of the first stiffener edge features is offset from a center axis of an adjacent one of the second stiffener edge features.

* * * * *